US010174234B2

(12) United States Patent
Hatanaka et al.

(10) Patent No.: US 10,174,234 B2
(45) Date of Patent: Jan. 8, 2019

(54) ADHESIVE COMPOSITION AND ADHESIVE SHEET

(71) Applicant: LINTEC Corporation, Itabashi-Ku, Tokyo (JP)

(72) Inventors: Tomio Hatanaka, Tokyo (JP); Yasukazu Nakata, Tokyo (JP); Takashi Matsushita, Tokyo (JP); Kazuaki Morita, Tokyo (JP)

(73) Assignee: LINTEC Corporation, Tokyo (JP)

( * ) Notice: Subject to any disclaimer, the term of this patent is extended or adjusted under 35 U.S.C. 154(b) by 0 days.

(21) Appl. No.: 15/128,925

(22) PCT Filed: Dec. 19, 2014

(86) PCT No.: PCT/JP2014/083667
§ 371 (c)(1),
(2) Date: Sep. 23, 2016

(87) PCT Pub. No.: WO2015/151352
PCT Pub. Date: Oct. 8, 2015

(65) Prior Publication Data
US 2017/0107410 A1      Apr. 20, 2017

(30) Foreign Application Priority Data
Mar. 31, 2014   (JP) .................. 2014-071091

(51) Int. Cl.
*C09J 7/38*          (2018.01)
*C09J 183/04*        (2006.01)
(Continued)

(52) U.S. Cl.
CPC .............. *C09J 183/04* (2013.01); *C08K 3/11* (2018.01); *C09J 7/38* (2018.01); *C08K 5/132* (2013.01);
(Continued)

(58) Field of Classification Search
None
See application file for complete search history.

(56) References Cited

U.S. PATENT DOCUMENTS 4,603,168 A      7/1986  Sasaki et al.
5,683,855 A  *  11/1997  Shinkai .................... B41M 5/52
                                              347/105
(Continued)

FOREIGN PATENT DOCUMENTS

DE        2736499 A1    2/1979
EP        0153700 A2    9/1985
(Continued)

OTHER PUBLICATIONS

Extended European Search Report dated Oct. 13, 2017 for corresponding application No. 14888549.4.

*Primary Examiner* — Frank D Ducheneaux
(74) *Attorney, Agent, or Firm* — Renner, Kenner; Arthur M. Reginelli

(57) ABSTRACT

A pressure-sensitive adhesive composition including an addition reaction type silicone polymer as a component (A); an ultraviolet absorber as a component (B); and a platinum group metal catalyst as a component (C). The ultraviolet absorber as the component (B) includes a benzophenone-based ultraviolet absorber and its amount is set to a value within the range of 1 part to 4 parts by weight relative to 100 parts by weight of the addition reaction type silicone polymer as the component (A). The amount of the platinum group metal catalyst as the component (C) is set to a value within the range of 0.001 parts to 0.05 parts by weight relative to 100 parts by weight of the addition reaction type silicone polymer as the component (A).

5 Claims, 5 Drawing Sheets

(51) Int. Cl.
*C08K 5/132* (2006.01)
*C08K 3/11* (2018.01)
*C08K 5/56* (2006.01)

(52) U.S. Cl.
CPC .... *C09J 2201/606* (2013.01); *C09J 2205/102* (2013.01); *C09J 2205/31* (2013.01); *C09J 2483/00* (2013.01)

(56) References Cited

U.S. PATENT DOCUMENTS

| | | | | |
|---|---|---|---|---|
| 2005/0277729 | A1* | 12/2005 | Tsunemine | ............ C09J 7/0207 |
| | | | | 524/558 |
| 2006/0008662 | A1* | 1/2006 | Arai | ............ C09J 183/04 |
| | | | | 428/447 |
| 2010/0221476 | A1 | 9/2010 | Kojima et al. | |
| 2011/0212328 | A1* | 9/2011 | Tanaka | ............ C09D 183/04 |
| | | | | 428/352 |
| 2012/0045635 | A1 | 2/2012 | Aoki | |
| 2014/0030516 | A1* | 1/2014 | Jo | ............ C09J 175/04 |
| | | | | 428/354 |
| 2014/0030517 | A1* | 1/2014 | Jo | ............ C09J 175/04 |
| | | | | 428/354 |
| 2014/0030518 | A1 | 1/2014 | Jo | |
| 2014/0037953 | A1* | 2/2014 | Jo | ............ C09J 175/04 |
| | | | | 428/355 AC |

FOREIGN PATENT DOCUMENTS

| | | |
|---|---|---|
| EP | 0238033 A2 | 9/1987 |
| JP | 2001-139924 A | 5/2001 |
| JP | 4292270 B | 7/2009 |
| JP | 2011-012092 A | 1/2011 |
| JP | 2011-017972 A | 1/2011 |
| JP | 2012-041505 A | 3/2012 |
| JP | 2012-182402 A | 9/2012 |
| NO | 2009/011446 A1 | 1/2009 |
| NO | 2011/087146 A | 7/2011 |
| NO | 2012/144352 A1 | 10/2012 |
| WO | WO 93/21245 A1 * 10/1993 | ............ C08F 283/12 |

* cited by examiner

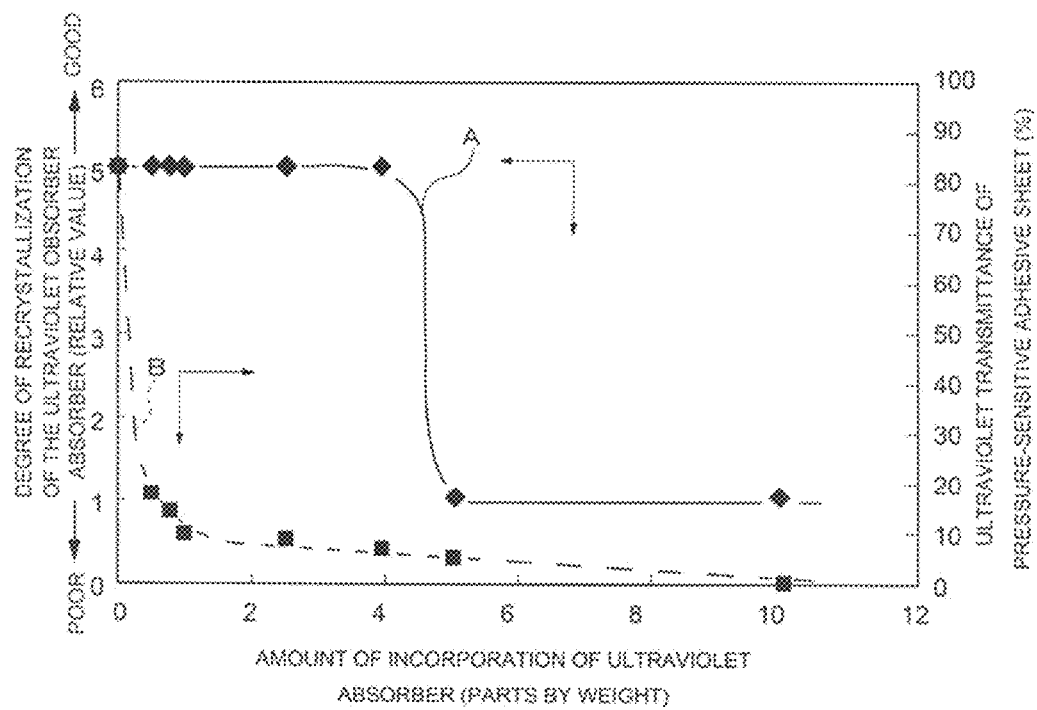

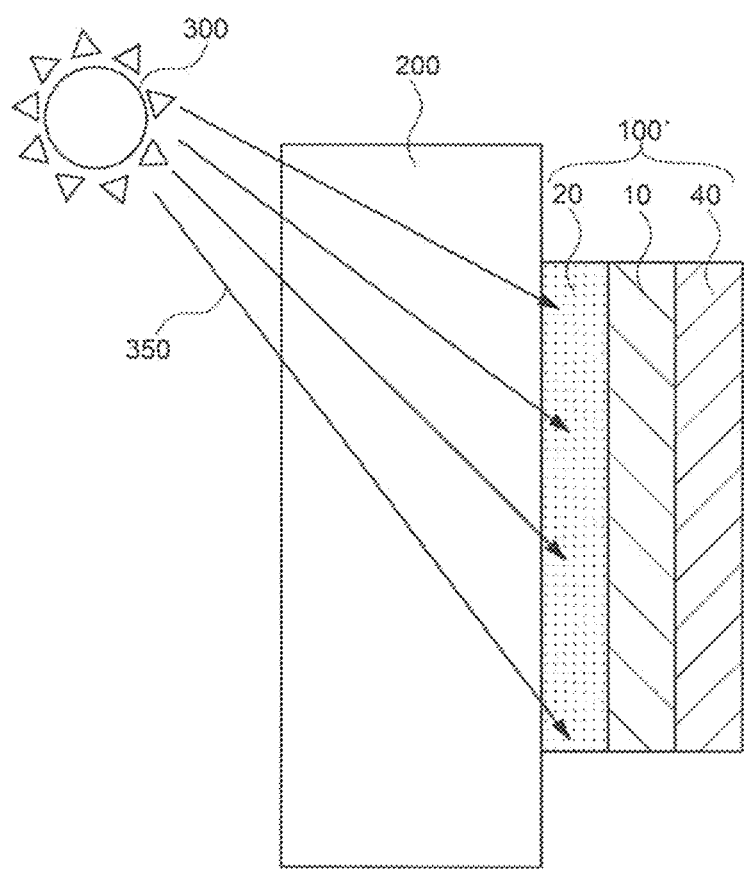

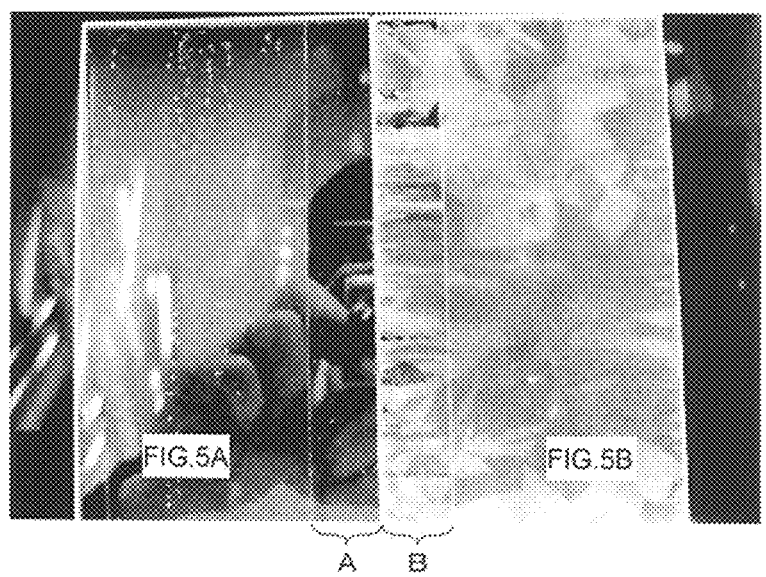

ADHESIVE COMPOSITION AND ADHESIVE SHEET

TECHNICAL FIELD

The present invention relates to an adhesive composition and an adhesive sheet.

In particular, the invention rebates to a pressure-sensitive adhesive composition having excellent weather resistance and containing a silicone polymer with excellent curability as a main agent, and to a pressure-sensitive adhesive sheet.

BACKGROUND ART

Decorative sheets used on window panes of shops, for example, are required to be easy to attach even for non-contractors, without trapping air. Even after failed attempts to fix them, these decorative sheets need to be easily reattachable.

In particular, decorative sheets used for advertisement, for example, need to be replaced after short time cycles. In that case, they should be easily peelable even after having been attached for a predetermined period of time.

Thus, silicone pressure-sensitive adhesives, which can cope with these requirements, have started to be used instead of conventional acrylic pressure-sensitive adhesives (see, for example, Patent Document 1).

That is, Patent Document 1 discloses a decorative fixed sheet in which an adhesion layer (pressure-sensitive adhesive layer) is provided on one surface of a substrate film. The adhesion layer is formed by crosslinking at least one silicone selected from a silicone composed of a linear polyorganosiloxane having vinyl groups only at the two molecular ends, and a silicone composed of a linear polyorganosiloxane having vinyl groups at the two molecular ends and side chains. An image-receiving layer (print-receiving layer) is provided on the other surface of the substrate film.

On the other hand, for example in the case of decorative sheets that are made for indoor applications on window panes of apparel-related shops, external light enters through the pressure-sensitive adhesive layer side. Consequently, in order to prevent external light-induced deterioration of the print-receiving layer, an ultraviolet absorber has to be incorporated into the pressure-sensitive adhesive.

Thus, silicone-based pressure-sensitive adhesives having a predetermined ultraviolet absorber incorporated therein have been suggested (see, for example, Patent Documents 2 and 3).

That is, Patent Document 2 relates to an invention of a polymeric ultraviolet absorber intended to be incorporated mainly into a silicone-based resin. The patent document discloses a silicone-containing polymeric ultraviolet absorber, which is a polymerization product based on (A) at least one ultraviolet-absorbing monomer selected from a benzophenone-based ultraviolet-absorbing monomer represented by the following Formula (1) and a benzotriazole-based ultraviolet-absorbing monomer represented by the following Formula (2); (B) silicone macromer represented by the following Formula (3); (C) a functional group-containing copolymerizable vinyl monomer; and (D) a functional group-containing copolymerizable vinyl monomer, the polymeric ultraviolet absorber having a weight average molecular weight of 10,000 to 100,000.

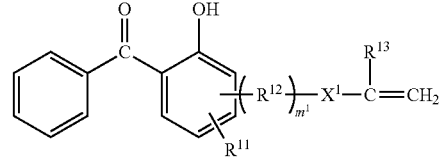

wherein in Formula (1), $R^{11}$ represents a hydrogen atom, an alkyl group having 1 to 8 carbon atoms, or an alkoxy group having 1 to 6 carbon atoms; $R^{12}$ represents an alkylene group having 1 to 10 carbon atoms, or an oxyalkeylene group having 1 to 10 carbon atoms; $m^1$ represents 0 or 1; $R^{13}$ represents a hydrogen atom, or a lower alkyl group; and $X^1$ represents an ester bond, an amide bond, an ether bend, or a urethane bond; and

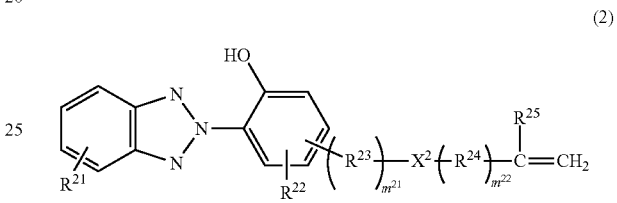

wherein in Formula (2), represents a hydrogen atom, a halogen atom, or a methyl group; $R^{22}$ represents a hydrogen atom, or a hydrocarbon group having 1 to 6 carbon atoms; $R^{23}$ represents an alkylene group having 1 to 10 carbon atoms, or an oxyalkylene group having 1 to 10 carbon atoms; $m^{21}$ represents 0 or 1; $R^{24}$ represents an alkylene group having 1 to 8 carbon atoms, an alkylene group having an amino group and 1 to 8 carbon atoms, or an alkylene group having a hydroxyl: group and 1 to 8 carbon atoms; $m^{22}$ represents 0 or 1; $R^{25}$ represents a hydrogen atom or a lower alkyl group; and $X^2$ represents an ester bond, an amide bond, an ether bond, or a urethane bond; and

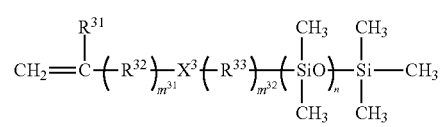

wherein in Formula (3), $R^{31}$ represents a hydrogen atom or a methyl group; $R^{32}$ represents an alkylene group having 1 to 6 carbon atoms, or an oxyalkylene group having 1 to 6 carbon atoms; $m^{31}$ represents 0 or 1; $R^{33}$ represents an alkylene group having 1 to 6 carbon atoms, an alkylene group having an amino group and 1 to 6 carbon atoms, or an alkylene group having a hydroxyl group and 1 to 6 carbon atoms, $m^{32}$ represents 0 or 1; and n represents an integer from 1 to 200.

Furthermore, Patent Document 3 discloses, as a pressure-sensitive adhesive composition applicable to decorative sheets or the like, a silicone-based re-adherable pressure-sensitive; adhesive composition containing an organopolysiloxane resin-organopolysiloxane reaction product (A), which is formed by subjecting the following component (a1) and component (a2) to a condensation reaction in the presence of component (a3):

(a1) 100 parts by weight of an organopolysiloxane resin essentially composed of a $R^1{}_3SiO_{1/2}$ unit (wherein $R^1$'s each independently represent a hydroxyl group, an alkoxy group having 1 to 8 carbon atoms, or a substituted or unsubstituted monovalent hydrocarbon group having 1 to 10 carbon atoms) and a $SiO_{4/2}$ unit, in which the molar ratio of the $R^1{}_3SiO_{1/2}$ unit with respect to the $SiO_{4/2}$ unit is 0.6 to 1.0, and the content of the hydroxyl group or the alkoxy group is within the range of 0.3% to 2.0% by weight;

(a2) 20 parts to 150 parts by weight of a linear or branched diorganopolysiloxane having at least one hydroxyl group or an alkoxy group having 1 to 6 carbon atoms in one molecule, and having an average degree of polymerization of 100 to 1,000; and (a3) a condensation reaction catalyst.

Furthermore, Patent Document 3 is described to the effect that a benzophenone-based ultraviolet absorber and the like can be incorporated as an ultraviolet absorber into the composition.

CITATION LIST

Patent Document

Patent Document 1: JP 4292270B1 (Claims)
Patent Document 2: JP 2001-139924 A (Claims)
Patent Document 3: WO 2011/087146A (Claims)

SUMMARY OF THE INVENTION

Problems to be Solved by the Invention

However, the adhesion layer (pressure-sensitive adhesive layer) of the decorative fixed sheet disclosed in Patent Document 1 does not contain any ultraviolet or the like. Therefore, if the decorative fixed sheet is attached, for example, to a window pane inside an apparel-related shop, it is inevitable that deterioration of the image-receiving layer (print-receiving layer) occurs due to external light that is incident through the adhesion layer (pressure-sensitive adhesive layer) of the decorative fixed sheet.

Furthermore, incorporation of silicone-containing polymeric ultra-violet absorber disclosed in Patent Document 2 in a silicone-based pressure-sensitive adhesive can impart, to some extent, weather resistance to the silicone-based pressure-sensitive adhesive. However, this silicone-containing polymeric ultraviolet absorber inhibits curing of silicone polymers. Thus, sufficient durability may be difficult to obtain.

As a result, it is difficult to prevent bleeding of low molecular weight substances from the silicone-based pressure-sensitive adhesive. Additionally, if the decorative sheet is peeled off from the adherend, the low molecular weight substances may easily contaminate the adherend.

Furthermore, the production process of predetermined silicone-containing polymeric ultraviolet absorbers is complicated and is markedly economically disadvantageous, compared to the ultraviolet absorbers that are commonly used.

Furthermore, Patent Document 3 discloses that a benzophenone-based ultraviolet absorber and the like can be incorporated into the silicone-based re-adherable pressure-sensitive adhesive composition. However, no specific description is given concerning, for example, the amount of incorporation of such ultraviolet absorber and there is no example of incorporating an ultraviolet absorber even in the Examples.

Despite the incorporation of an ultraviolet absorber into the silicone-based re-adherable pressure-sensitive adhesive composition of Patent Document 3, the kind and amount of incorporation of the ultraviolet absorber have not been sufficiently examined. Therefore, there may be problems such as insufficient weather resistance, or insufficient curability due to curing inhibition of silicone polymers.

The inventors of the invention conducted a thorough investigation in view of the above-mentioned circumstances, and they found that a good balance can be achieved between contradictory characteristics, namely, weather resistance and curability of the silicone polymer, by incorporating a predetermined ultraviolet absorber into a silicone polymer as a main agent in an amount in a predetermined range. Thus, the inventors completed the invention.

That is, an object of the invention is to provide a pressure-sensitive adhesive composition having excellent weather resistance and containing a silicone polymer having excellent curability as a main agent, and to provide a pressure-sensitive adhesive sheet.

Means for Solving Problem

According to the invention, there is provided a pressure-sensitive adhesive composition including an addition reaction type silicone polymer as a Component (A); an ultraviolet absorber as a component (B); and a platinum group metal catalyst as a component (C), in which the ultraviolet absorber as the component (B) includes a benzophenone-based ultraviolet absorber, the amount of incorporation of the ultraviolet absorber as the component (B) is set to a value within the range of 1 part to 4 parts by weight relative to 100 parts by weight of the addition reaction type silicone polymer as the component (A), and the amount of incorporation of the platinum group metal catalyst as the component (C) is set to a value within the range of 0.001 parts to 0.05 parts by weight relative to 100 parts by weight of the addition reaction type silicone polymer as the component (A). Thus, the problems described above can be solved.

That is, for the pressure-sensitive adhesive composition, a good balance can be achieved between contradictory characteristics, namely, weather resistance and curability of the silicone polymer, by incorporating a predetermined ultraviolet absorber in an amount in a predetermined range into an addition reaction type silicone polymer as a main agent.

More specifically, the addition reaction of the silicone polymer catalyzed by a platinum group metal catalyst can be effectively prevented from being inhibited by an ultraviolet absorber, and a better balance can be achieved between contradictory characteristics, namely, weather resistance and curability of the silicone polymer.

Therefore, with the pressure-sensitive adhesive composition of the invention, a pressure-sensitive adhesive sheet having excellent weather resistance and containing a silicone polymer having excellent curability as a main agent can be stably obtained.

Meanwhile, the "pressure-sensitive adhesive composition" according to the invention means a composition before the silicone polymer as a main agent is cured, and the pressure-sensitive adhesive composition obtainable after curing the silicone polymer as a main agent will be referred to as "pressure-sensitive adhesive".

Furthermore, on the occasion of configuring the pressure-sensitive adhesive composition of the invention, it is preferable that the benzophenone-based ultraviolet absorber is at least one compound selected from the group consisting of 2,2'-dihydroxy-4-methoxybenzophenone, 2,4-dihydroxybenzophenone, 2-hydroxy-4-methoxybenzophenone, 2-hydroxy-4-octoxybenzophenone, 2-hydroxy-4-methoxybenzophene-5-sulfonic acid hydrate, 2-hydroxy-4-octylbenzophenone, 4-dodecyloxy-2-hydroxybenzophenone, 2,2',4,4'-tetrahydroxybenzophenone, and 2,2'-dihydroxy-4,4'-dimethoxybenzophenone.

With such a configuration of the pressure-sensitive adhesive composition, a good balance can be achieved between contradictory characteristics, namely, weather resistance and curability of the silicone polymer.

Furthermore, according to another embodiment of the invention, there is provided a pressure-sensitive adhesive sheet having a substrate; a pressure-sensitive adhesive layer; and a release film, the pressure-sensitive adhesive layer being a pressure-sensitive adhesive layer formed from a pressure-sensitive adhesive composition including an addition reaction type silicone polymer as a component (A), an ultraviolet absorber as a component (B), a platinum group metal catalyst as a component (C), in which the ultraviolet absorber as the component (B) includes a benzophenone-based ultraviolet absorber, the amount of incorporation of the ultraviolet absorber as the component (B) is set to a value within the range of 1 part to 4 parts by weight relative to 100 parts by weight of the addition reaction type silicone polymer as the component (A), and the amount of incorporation of the platinum group metal catalyst as the component (C) is set to a value within the range of 0.001 parts to 0.05 parts by weight relative to 100 parts by weight of the addition reaction type silicone polymer as the component (A).

That is, since the pressure-sensitive adhesive sheet of the invention has a pressure-sensitive adhesive layer formed from a predetermined pressure-sensitive adhesive composition, it can achieve a balance between contradictory characteristics, namely, weather resistance, and curability of the silicone polymer.

Furthermore, on the occasion of configuring the pressure-sensitive adhesive sheet of the invention, it is preferable that the pressure-sensitive adhesive sheet has a print-receiving layer on the surface of the substrate on the opposite side of the pressure-sensitive adhesive layer.

For applications of the pressure-sensitive adhesive sheet such as a decorative pressure-sensitive adhesive sheet inside an apparel-related shop, such a configuration can effectively prevent deterioration of the print-receiving layer caused by external light that enters through the pressure-sensitive adhesive layer side.

Furthermore, on the occasion of configuring the pressure-sensitive adhesive sheet of the invention, it is preferable that the print-receiving layer is a cured product of a photocurable coating material.

When printing is performed using a UV inkjet printer, such a configuration can enhance the adhesiveness between a UV ink and the print-receiving layer.

Furthermore, on the occasion of configuring the pressure-sensitive adhesive sheet of the invention, it is preferable that the film thickness of the pressure-sensitive adhesive layer is adjusted to a value within the range of 5 μm to 50 μm.

Such a configuration enables the curing reaction to be carried out efficiently and provides conformity to surface unevenness and a predetermined adhesive force at the time of fixing.

BRIEF DESCRIPTION OF DRAWINGS

FIG. 2 is a diagram provided to describe the relationship between the amount of incorporation of the ultraviolet absorber, and the degree of recrystallization of the ultraviolet absorber as well as the ultraviolet transmittance of the pressure-sensitive adhesive sheet;

FIG. 4 is a diagram provided to describe the basic usage mode of the pressure-sensitive adhesive sheet of the invention;

FIG. 5A is a photograph provided to show curability of the pressure-sensitive adhesive and the degree of recrystallization of the ultraviolet absorber in Example 1; and FIG. 5B is a photograph provided to show curability of the pressure-sensitive adhesive and the degree of recrystallization of the ultraviolet absorber in Comparative Example 4.

MODES FOR CARRYING OUT THE INVENTION

First Embodiment

Figure 1:
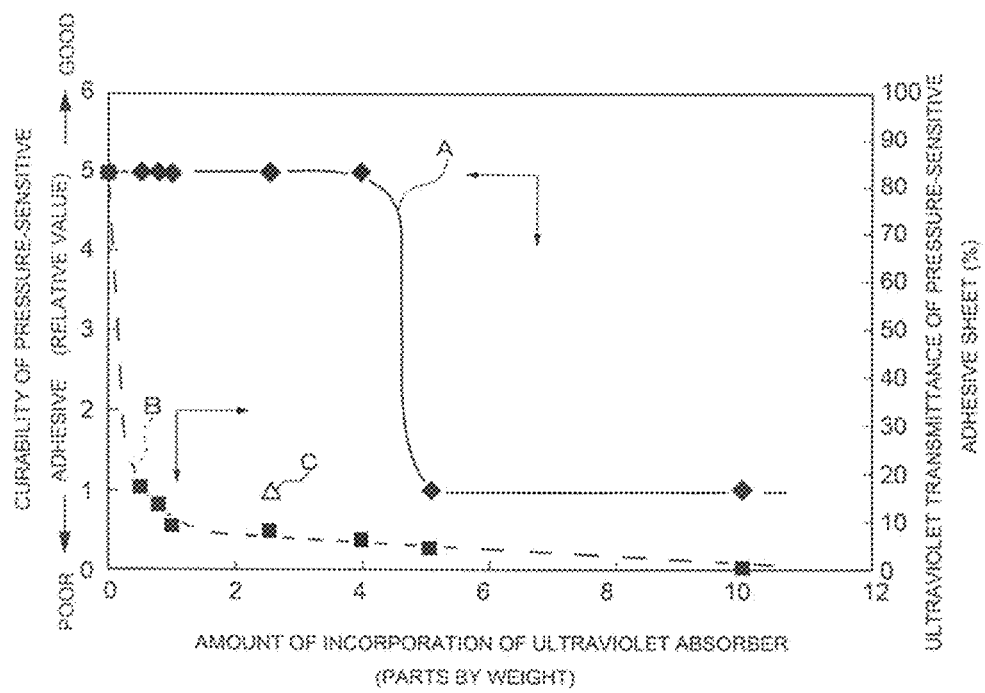
FIG. 1 is a diagram provided to describe the relationship between the amount of incorporation of the ultraviolet absorber, and curability of the pressure-sensitive adhesive as well as the ultraviolet transmittance of the pressure-sensitive adhesive.

According to a first embodiment of the invention, there is provided a pressure-sensitive adhesive composition including an addition reaction type silicone polymer as a component (A); an ultra violet absorber as a component (B); and a platinum group metal catalyst as a component (C), in which the ultraviolet absorber as the component (B) includes a benzophenone-based ultraviolet absorber the amount of incorporation of the ultraviolet absorber as the component (B) is set to a value within the range of 1 part to 4 parts by weight relative to 100 parts by weight of the addition reaction type silicone polymer as the component (A), and the amount of incorporation of the platinum group metal catalyst as the component (C) is set to a value within the range of 0.001 parts to 0.05 parts by weight relative to 100 parts by weight of the addition reaction type silicone polymer as the component (A).

In the following description, the first embodiment of the invention will be specifically described with appropriate reference to the drawings.

1. Component (A): Addition Reaction Type Silicone Polymer

The pressure-sensitive adhesive composition of the invention is characterized by including an addition reaction type silicone polymer as a component (A).

Regarding the kind of such an addition reaction type silicone polymer, it is preferable to use an addition reaction type silicone polymer including a commonly used chain-like organopolysiloxane and a solid-state silicone resin.

More specifically, it is preferable to use an addition reaction type silicone polymer including a chain-like vinyl group-containing organopolysiloxane, an organopolysiloxane copolymer resin, an organohydrogen polysiloxane containing a silicon-bonded hydrogen atom as a crosslinking curing agent, and the platinum group metal catalyst as a component (C) that will be described below.

Furthermore, the kind of the silicone polymer is not particularly limited, and the silicone polymer may also be a modified silicone polymer having an organic group introduced into a side chain or the terminals of a silicone polymer.

Examples of such a modified silicone polymer include a monoamine-modified silicone polymer, a diamine-modified silicone polymer, a special amino-modified silicone polymer, an epoxy-modified silicone polymer, an alicyclic epoxy-modified silicone polymer, a carbinol-modified silicone polymer a mercapto-modified silicone polymer a carboxyl-modified silicone polymer, a hydrogen-modified silicone, polymer, a polyether-modified silicone polymer an aralkyl-modified silicone polymer, a fluoroalkyl-modified silicone polymer, a phenyl-modified silicone polymer, an acrylic-modified silicone polymer, a methacrylic-modified silicone polymer, a phenol-modified silicone polymer, a silanol-modified silicone polymer, a carboxylic acid anhydride-modified silicone polymer, a long-chain alkyl-modified silicone polymer, a higher fatty acid ester-modified silicone polymer, a higher fatty acid amide-modified silicone polymer, an amino polyether-modified silicone polymer, an epoxy polyether-modified silicone polymer, an epoxy aralkyl-modified silicone polymer, a polyether long-chain alkyl aralkyl-modified silicone polymer, a long-chain alkyl aralkyl-modified silicone polymer, a polyether methoxy-modified silicone polymer, and a diol-modified silicone polymer.

Furthermore, for example, the silicone polymer may also be a polymer of a type having a silyl group in a side chain or terminals of a non-silicone skeleton such as a polyether skeleton, a urethane skeleton, or an acrylic skeleton.

Specific examples of such an addition reaction type silicone polymer include X-40-3068, X-40-3103, X-40-3104, X-40-3102, X-40-3229, KR-3700, and X-40-3038 manufactured by Shin-Etsu Chemical Co., Ltd.; TSR1516, XR37-89204, and XR37-B8722 manufactured by GE Toshiba Silicones Co., Ltd.; and SD4560, SD4570, SD4580, SD4584, SD4585, SD4587L, SD4592, and BY24-740 manufactured by Dow Corning Toray Co., Ltd.

2. Component (B): Ultraviolet Absorber

Furthermore, the pressure-sensitive adhesive composition of the invention b characterized by including an ultraviolet absorber as a component (B).

The reason for this is that for applications such as, for example, a decorative sheet attached to a window pane inside an apparel-related shop, since external light enters through the pressure-sensitive adhesive layer side of the decorative sheet, it is necessary to incorporate an ultraviolet absorber into the pressure-sensitive adhesive in order to prevent external light-induced deterioration of the print-receiving layer and the print layer.

(1) Kind of Ultraviolet Absorber

The ultraviolet absorber according to the invention is characterized by including a benzophenone-based ultraviolet absorber.

The reason for this is that, for a pressure-sensitive adhesive composition containing an addition reaction type silicone polymer as a main agent and containing a platinum group metal catalyst as a catalyst, for example, if an ultraviolet absorber such as a hindered amine-based ultraviolet absorber, a benzotriazole-based ultraviolet absorber, or a hydroxyphenyltriazine-based ultraviolet absorber is incorporated into the composition, the curing reaction of the silicone polymer is inhibited. Thus, it may be difficult to obtain sufficient curability.

As a result, it is difficult to prevent bleeding of low molecular weight substances from the pressure-sensitive adhesive thus obtained. It has been confirmed that, if the pressure-sensitive adhesive sheet is peeled off from the adherend, the low molecular weight substances may easily contaminate the adherents (see Comparative Examples 7 to 10).

On the other hand, it has been confirmed that, with a benzophenone-based ultraviolet absorber, as will be described below, curability can be stably maintained without inhibiting the curing reaction of the silicone polymer, by adjusting the amount of incorporation of the ultraviolet absorber to a value within a predetermined range (see Examples 1 to 4).

The reason is that benzophenone-based ultraviolet absorbers do not contain nitrogen atoms in their molecular structure, unlike triazine-based or triazole-based ultraviolet absorbers. Consequently, during the curing process of a silicon polymer, curing is not inhibited by the deterioration of the catalyst function.

Therefore, by using a benzophenone-based ultraviolet absorber as the ultraviolet absorber, a good balance can be achieved between contradictory characteristics, namely, weather resistance and curability of the silicone polymer.

Furthermore, it is preferable that the benzophenone-based ultraviolet absorber is at least one selected from the group consisting of 2,2'-dihydroxy-4-methoxybenzophenone, 2,4-dihydroxybehzophenone-2-hydroxy-4-methoxybenzopbenone, 2-hydroxy-4-octoxybenzophenone, 2-hydroxy-4-methoxybenzophenone-5-sulfonic acid hydrate, 2-hydroxy-4-octyloxybenzophenone, 4-dodecyloxy-2-hydroxybenzophenone, 2,2',4,4'-tetrahydroxybenzophenone, and 2,2'-dihydroxy-dimethoxybenzophenone.

The reason for this is that, by using these benzophenone-based ultraviolet absorbers, a good balance can be achieved between contradictory characteristics, namely, weather resistance and curability of the silicone polymer.

That is, since these benzophenone-based ultraviolet absorbers do not contain nitrogen atoms in their molecular structure, unlike triazine-based or triazole-based ultraviolet absorbers, when they are used, curing of the silicon polymer is not inhibited by the deterioration of the catalyst function during the curing process.

(2) Amount of Incorporation

Furthermore, the pressure-sensitive adhesive composition of the invention is characterized in that the amount of incorporation of the ultraviolet absorber is set to a value within the range of 1 part to 4 parts by weight relative to 100 parts by weight of the silicone polymer as the component (A).

The reason for this is that, if the amount of incorporation of the ultraviolet absorber has a value of below 1 part by weight, the ultraviolet transmittance of the pressure-sensitive adhesive obtainable by curing the pressure-sensitive adhesive composition acquires an excessively large value, and it may become difficult to obtain sufficient weather resistance. On the other hand, if the amount of incorporation of the ultraviolet absorber has a value of above 4 parts by weight, deterioration of the silicone polymer curability is excessive, and contamination of the adherend by low molecular weight substances also tends to be excessive.

Therefore, it is more preferable to adjust the amount of incorporation of the ultraviolet absorber to a value within the range of 1.2 parts to 3.8 parts by weight, and even more preferably to a value within the range of 1.5 parts to 3.5 parts by weight, relative to 100 parts by weight of the silicone polymer as the component (A).

Next the relationship between the amount of incorporation of the ultraviolet absorber and the curability of the pressure-sensitive adhesive as well as the ultraviolet transmittance of the pressure-sensitive adhesive sheet will be described using FIG. 1.

That is, FIG. 1 shows characteristic curve A based on the amount of incorporation (parts by weight) of 2,2'-dihydroxy-4-methoxybenzophenone as a benzophenone-based ultraviolet absorber relative to 100 parts by weight of the silicone polymer, which is represented by the horizontal axis, and the curability (relative value) of the pressure-sensitive adhesive, which is represented by the let-hand side vertical axis; and characteristic curve B based on the same amount of incorporation represented by the horizontal axis, and the ultraviolet transmittance (%) of the pressure-sensitive adhesive sheet thus obtained, which is represented by the right-hand side vertical axis.

Furthermore, there is shown point C based on the amount of incorporation (parts by weight) of a non-benzophenone-based ultraviolet absorber relative to 100 parts by weight of the silicone polymer, which is represented by the horizontal axis, and the curability (relative value) of the pressure-sensitive adhesive thus obtained, which is represented by the left-hand side vertical axis.

As the non-benzophenone-based ultraviolet absorber, a hindered amine-based ultraviolet absorber, a benzotriazole-based ultraviolet absorber and a hydroxyphenyltriazine-based ultraviolet, absorber were used individually; however, all of the plots obtained with those ultraviolet-absorbers overlap at the position of point C.

Furthermore, the details of the pressures-sensitive adhesive composition and the pressure-sensitive adhesive sheet, and the conditions for evaluation of the curability of the pressure-sensitive adhesive and the ultraviolet transmittance of the pressure-sensitive adhesive sheet will be described in the Examples.

Furthermore, the curability of the pressure-sensitive adhesive was evaluated by attaching a pressure-sensitive adhesive sheet to an adherend made of glass, subsequently tearing off the pressure-sensitive adhesive layer from the glass after 1 minute, and rating the degree of contamination of the adherend surface after tearing off. The degree of contamination was calculated as a relative value based on the following criteria.

Larger values of the relative value mean that the pressure-sensitive adhesive has superior curability.

Relative value 5: Opacity and resin residue are not observed on the glass surface.

Relative value 3: Opacity and resin residue are slightly observed on the glass surface.

Relative value 1: Opacity and resin residue are observed on the glass surface.

First, as can be understood from the characteristic curve A, when the amount of incorporation of the benzophenone-based ultraviolet absorber is within the range of 4 parts by weight or less, curability of the pressure-sensitive adhesive is stabilized and can maintain an excellent state. On the other hand, if the amount of incorporation of the benzophenone-based ultraviolet absorber has a value of above 4 parts by weight curability of the pressure-sensitive adhesive is rapidly decreased.

Also, as can be seen from the characteristic curve B, the ultraviolet transmittance of the pressure-sensitive adhesive sheet has a value of above 10% when the amount of incorporation of the benzophenone-based ultraviolet absorber is within the range of below 1 part by weight, and it is difficult to obtain sufficient weather resistance. On the other hand, when the amount of incorporation of the benzophenone-based ultraviolet absorber is within the range of 1 part by weight or more, an ultraviolet transmittance value of 10% or less can be stably obtained.

Therefore, it is understood from the characteristic curves A and B that when the amount of incorporation of the benzophenone-based ultraviolet-absorber is adjusted to a value within the range of 1 part to 4 parts by weight relative to 100 parts by weight of the silicone polymer, a good balance can be achieved between contradictory characteristics, namely weather resistance and the curability of the silicone polymer.

Meanwhile, it is understood that in point C, if a non-benzophenone-based ultraviolet absorber is used, even if the amount of incorporation of the ultraviolet absorber is set to a value within the range of 1 part to 4 parts by weight relative to 100 parts by weight of the silicone polymer, curability of the pressure-sensitive adhesive is markedly decreased.

Next, the relationship between the amount of incorporation of the ultraviolet absorber and the degree of recrystallization of the ultraviolet absorber as well as the ultraviolet transmittance of the pressure-sensitive adhesive sheet will be described using FIG. 2.

That is, FIG. 2 shows characteristic curve A based on the amount of incorporation (parts by weight) of 2,2'-dihydroxy-4-methoxybenzophenone as a benzophenone-based ultraviolet absorber relative to 100 parts by weight of the silicone polymer, which is represented by the horizontal axis, and the degree of recrystallization (relative value) of ultraviolet absorber in the pressure-sensitive adhesive thus obtained, which is represented by the left-hand side vertical axis; and characteristic curve B based on the same amount of incorporation represented by the horizontal axis, and the ultraviolet transmittance (%) of the pressure-sensitive adhesive sheet thus obtained, which is represented by the right-hand side vertical axis.

Furthermore, the details of the pressure-sensitive adhesive composition and the pressure-sensitive adhesive sheet, and the conditions for evaluation of the degree of recrystallization of the ultraviolet absorber and the ultraviolet transmittance of the pressure-sensitive adhesive sheet, will be described in the Examples.

Furthermore, the degree of recrystallization of the ultraviolet absorber was evaluated by attaching the pressure-sensitive adhesive sheet to an adherend made of glass and visually observing the attached surface through the glass side, and the degree of recrystallization was calculated as a relative value based on the following criteria.

Larger values of the relative value mean that recrystallization of the ultraviolet absorber can be prevented.

Relative value 5: The attached surface is transparent thus recrystallization of the ultraviolet absorber is not observed.

Relative value 3: The attached surface is slightly opaque, thus recrystallization of the ultraviolet absorber is slightly observed.

Relative value 1: The attached surface is opaque, thus recrystallization of the ultraviolet absorber is observed.

First, as is understood from the characteristic curve A, when the amount of Incorporation of the benzophenone-based ultraviolet absorber is within the range of 4 parts by weight or less, the degree of recrystallization of the ultraviolet absorber is stabilized and can maintain an excellent state. On the other hand, if the amount of incorporation of the benzophenone-based ultraviolet absorber has a value of above 4 parts by weight, the degree of recrystallization dramatically decreases.

Also, although this overlaps within the description of FIG. 1, as is understood from the characteristic curve B, the ultraviolet transmittance of the pressure-sensitive adhesive sheet has a value of above 10% when the amount of incorporation of the benzophenone-based ultraviolet absorber is below 1 part by weight, and it is then difficult to obtain sufficient weather resistance. On the other hand, when the amount of incorporation of the benzophenone-based ultraviolet absorber is 1 part by weight or more, an ultraviolet transmittance value of 10% or less can be stably obtained.

Therefore, it is understood from the characteristic curves A and B that when the amount of incorporation of the benzophenone-based ultraviolet absorber is set to a value within the range of 1 part to 4 parts by weight relative to 100 parts by weight of the silicone polymer, a good balance can be achieved even between weather resistance and the degree of recrystallization of the ultraviolet absorber.

3. Component (C): Platinum Group Metal Catalyst

Furthermore, on the occasion of configuring the pressure-sensitive adhesive composition of the invention, the pressure-sensitive adhesive composition is characterized by including a platinum group metal catalyst as a component (C).

The reason for this is that, for the pressure-sensitive adhesive of the invention, the incorporation of a predetermined ultraviolet absorber in an amount within a predetermined range can effectively prevent the inhibition of the addition reaction of a silicone polymer catalyzed by a platinum group metal catalyst. A better balance can thus be achieved between contradictory characteristics, namely, weather resistance and curability of the silicone polymer.

(1) Kind of Platinum Group Metal Catalyst

Furthermore, the kind of the platinum group metal catalyst is not particularly limited; however, it is preferable to use, for example, chloroplatinic acid, an alcohol-modified chloroplatinic acid, a platinum-olefin complex, or a platinum-vinylsiloxane complex.

Meanwhile, specific examples of such a platinum group metal catalyst include CAT-PL-50T manufactured by Shin-Etsu Chemical Co., Ltd., and SRX-212 manufactured by Dow Corning Toray Co., Ltd.

(2) Amount of Incorporation

Furthermore, the invention is characterized in that the amount of incorporation of the platinum, group metal catalyst is set to a value within the range of 0.001 parts to 0.05 parts by weight relative to 100 parts by weight of the silicone polymer as the component (A).

The reason for this is that, if the amount of incorporation of the platinum group metal catalyst has a value of below 0.001 parts by weight, even if the pressure-sensitive adhesive composition is subjected to a predetermined drying treatment the curing reaction may not sufficiently proceed. On the other hand, if the amount of incorporation of the platinum group metal catalyst has a value of above 0.05 parts by weight, it exceeds the saturation amount for obtaining the desired curing reaction. Considering that platinum catalysts are highly expensive, this is economically disadvantageous.

Therefore, if is more preferable to adjust the amount of incorporation of the platinum group: metal catalyst, to a value within the range of 0.005 parts to 0.045 parts by weight, and even more preferably to a value within the range of 0.007 parts to 0.04 parts by weight, relative to 100 parts by weight of the silicone polymer as the component (A).

Second Embodiment

Figure 3A:
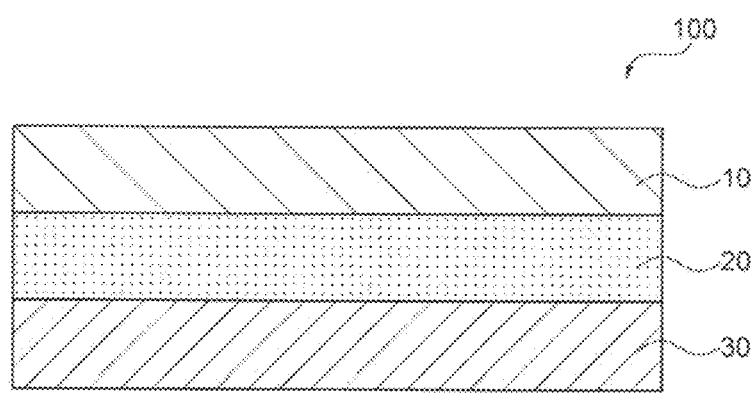
FIGS. 3(a) and 3(b) are diagrams provided to describe the fundamental configurations of the pressure-sensitive adhesive sheet of the invention.

According to a second embodiment of the invention, as illustrated in FIG. 3(a), there is provided a pressure-sensitive adhesive sheet 100 having a substrate 10; a pressure-sensitive adhesive layer 20; and a release film 30, the pressure-sensitive adhesive layer 20 being a pressure-sensitive adhesive layer 20 formed from a pressure-sensitive adhesive composition including an addition reaction type silicone polymer as a component (A), an ultraviolet absorber as a component (B), and a platinum group metal catalyst as a component (C), in which the ultraviolet absorber as the component (B) includes a benzophenone-based ultraviolet absorber, the amount of incorporation of the ultraviolet absorber as the component (B) is set to a value within the range of 1 part to 4 parts by weight relative to 100 parts by weight of the addition reaction type silicone polymer as the component (A), and the amount of incorporation of the platinum group metal catalyst as the component (G) has a value within the range of 0.001 parts to 0.05 parts by weight relative to 100 parts by weight of the addition reaction type silicone polymer as the component (A).

In the following description, the second embodiment of the invention will be specifically described with appropriate reference to the drawings.

Figure 3B:
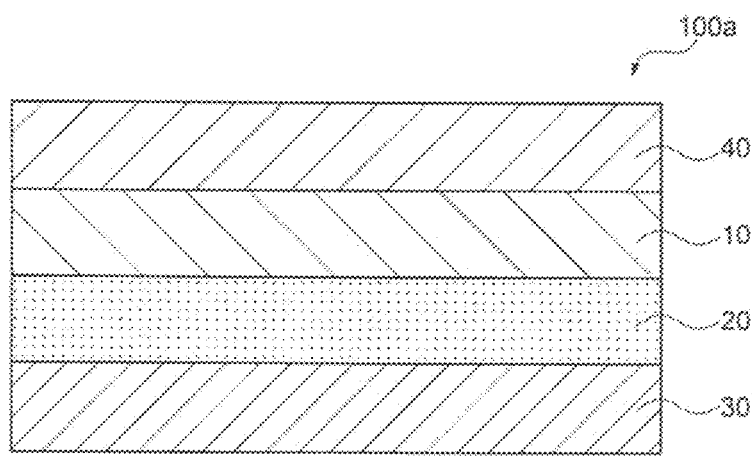

Meanwhile, FIG. 3(b) illustrates a pressure-sensitive adhesive sheet 100a of a type having a print-receiving layer 40 on the surface of a substrate 10.

1. Basic Usage Mode

First a basic usage mode of the pressure-sensitive adhesive sheet of the invention will be described using FIG. 4.

FIG. 4 illustrates a pressure-sensitive adhesive sheet 100' attached to an window pane 200 as an adherend, corresponding to the pressure-sensitive adhesive sheet 100a of FIG. 3(b) for which the release film 30 is peeled off and the pressure-sensitive adhesive layer 20 is exposed.

As described in the first embodiment, since the pressure-sensitive adhesive sheet 100' of the invention has a pressure-sensitive adhesive layer 20 formed from a predetermined pressure-sensitive adhesive composition, a balance can be achieved between contradictory characteristics, namely, weather resistance and the curability of the silicone polymer.

Consequently, as illustrated in FIG. 4, the pressure-sensitive adhesive sheet can be stably and re-adherably attached to, for example, a window pane 200 for applications inside an apparel-related shop. Also, deterioration of the print-receiving layer 40 by ultraviolet radiation 350 that is induced in the external light coming from the sun 300, which enters through the side of the pressure-sensitive adhesive layer 20, can be effectively prevented.

2. Substrate

Furthermore, the kind of the substrate is not particularly limited. It can be, for example, a polyethylene terephthalate film, a polyethylene naphthalate film, a polyimide film, a polyetherimide film, a polyaramid film, a polyether ketone film, a polyether ether ketone film, a polyphenylene sulfide film, a poly(4-methylpentene-1) film. However, from the viewpoints of heat resistance dimensional stability, and economic efficiency, a polyethylene terephthalate film or a polyethylene naphthalate film is preferred.

Meanwhile, it is preferable to set the film thickness of the substrate to a value within the range of 5 μm to 300 μm, more preferably to a value within the range of 10 μm to 20 μm, and even more preferably to a value within the range of 20 μm to 160 μm.

3. Pressure-Sensitive Adhesive Layer

Furthermore, the pressure-sensitive adhesive layer in the pressure-sensitive adhesive sheet of the invention is characterized by being a pressure-sensitive adhesive layer formed from a pressure-sensitive adhesive composition including a silicone polymer as a component (A); an ultraviolet absorber as a component (B); and a platinum group metal catalyst as a component (C).

Meanwhile, since the details of such a predetermined pressure-sensitive adhesive composition have already been described in the first embodiment, no further description will be repeated here.

Furthermore, it is preferable to set the film thickness of the pressure-sensitive adhesive layer to a value within the range of 5 µm to 50 µm.

The reason for this is that, if the film thickness of the pressure-sensitive adhesive layer has a value of below 5 µm, the adhesive force decreases excessively, and the pressure-sensitive adhesive sheet may be easily peeled off from the adherend, conformity to surface unevenness at the time of attachment may decrease, or the desired ultraviolet absorption performance may not be obtained. On the other hand, if the film thickness of the pressure-sensitive adhesive layer has a value of above 50 µm, even after a predetermined drying treatment, problems may arise, such as the curing reaction not proceeding sufficiently, easy extrusion of the pressure-sensitive layer from between the substrate and the release film, or decrease of the economic efficiency.

Therefore, it is more preferable to adjust the film thickness of the pressure-sensitive adhesive layer to a value within the range of 8 µm to 40 µm, and even more preferably to a value within the range of 7 µm to 30 µm.

4. Release Film

Furthermore, the kind of the release film is not particularly limited. It can be, for example, a polyethylene terephthalate film, a polyethylene film, a polypropylene film, which have been coated with release agents such as a fluorine-based resin, a silicone-based resin, and a long-chain alky group-containing carbamate.

It is preferable to adjust the film thickness of the release film to a value within the range of 10 µm to 250 µm, more preferably to a value within the range of 15 µm to 200 µm, and even more preferably to a value within the range of 20 µm to 150 µm.

5. Print-Receiving Layer

Furthermore, as illustrated in FIG. 3(b), if is preferable that the pressure-sensitive adhesive sheet has a print-receiving layer on the surface of the substrate on the opposite side of the pressure-sensitive adhesive layer.

The reason for this is that, such a configuration, as illustrated in FIG. 4, for example, for which the pressure-sensitive adhesive sheet 100' is attached to the window pane 200 inside an apparel-related shop, can prevent deterioration of the print-receiving layer 40 caused by ultraviolet radiation 350 that is included in the external light corning from the sun 300, which enters through the side of the pressure-sensitive adhesive layer 20.

The reason it that the pressure-sensitive adhesive sheet 100' of the invention includes a predetermined pressure-sensitive adhesive layer 20 having excellent ultraviolet absorption ability.

Therefore, the print-receiving layer 40 can be effectively prevented from being embrittled and peeled off from the substrate 10, and the print-receiving layer 40 and the information or design printed on the print-receiving layer 40 can also be effectively prevented from becoming visually deteriorated due to, for example, yellowing.

The print-receiving layer 40 may be formed by thermally curing a thermosetting coating material; however, it is morn preferable to form the print-receiving layer 40 by photocuring a photocurable coating material.

The reason for this is that by adopting such a configuration for the print-receiving layer 40, when printing is performed using a UV inkjet printer, the adhesiveness between the UV ink and the print-receiving layer can be enhanced.

Meanwhile, regarding the photocurable coating material, any conventionally known coating material can be appropriately used. This can be, for example, an acrylate-based ultraviolet-curable resin including an acrylic oligomer having a polymerizable double bond, a polymerizable acrylic monomer, a photopolymerization initiator, or a pigment.

6. Production Method

Furthermore, it is preferable that the pressure-sensitive adhesive sheet of the invention is produced via the following steps (1) to (4):

(1) a step of preparing a pressure-sensitive adhesive composition;

(2) a step of applying the pressure-sensitive adhesive composition on a substrate, and forming a coating film;

(3) a step of curing the coating film by performing a drying treatment thereon, and obtaining a pressure-sensitive adhesive layer; and (4) a step of laminating a release film on the pressure-sensitive adhesive layer.

(1) Step (1): Pressure-Sensitive Adhesive Composition Preparation Step

Step (1) is a step of preparing a predetermined pressure-sensitive adhesive composition.

Since, such a pressure-sensitive adhesive composition has already been described, no further description will be repeated here.

Meanwhile, it is preferable to adjust the viscosity of the pressure-sensitive adhesive composition by adding, for example, a solvent such as toluene thereto.

(2) Step (2): Coating Step

Step (2) is a step of applying the pressure-sensitive adhesive composition on a substrate, and forming a coating film.

The coating method can be, for example, a bar coating method, a knife coating method, a roll coating method, a blade coating method, a die coating method, or a gravure coating method.

(3) Step (3): Curing Step

Step (3) is a step of curing the coating film thus obtained by performing a drying treatment thereon, and obtaining a pressure-sensitive adhesive layer.

Usually, it is preferable to perform the drying treatment at a temperature of 80° C. to 150° C. for 10 seconds to 10 minutes.

(4) Step (4): Lamination Step

Step (4) is a step of laminating a release film on the pressure-sensitive adhesive layer thus obtained.

In such a lamination step, the release-treated surface of the release film is laminated on the surface of the pressure-sensitive adhesive layer obtained by subjecting the coating film to a drying treatment.

Furthermore, it is preferable to carry out a process of forming a print-receiving layer on the surface of the substrate on the opposite side of the pressure-sensitive adhesive layer.

More specifically, if is preferable to first apply a photocurable coating material on the surface of the substrate on the opposite side of the pressure-sensitive adhesive layer to form a coating film, and then to photocure this coating film.

The coating method can be a conventional wet type coating method, such as a dipping method, a roll coating method, a gravure coating method, a knife coating method, an air knife coating method, a roll knife coating method, a die coating method, a screen printing method, and a spray coating method.

Furthermore, regarding the curing conditions for the coating film, it is preferable to irradiate the coating film with ultraviolet radiation in an amount of radiated energy of 50 mJ/cm$^2$ to 1,000 mJ/cm$^2$ for an irradiation time of 3 seconds to 15 seconds, using a light source such as a high-pressure UV lamp, or a metal halide lamp.

Meanwhile, such a process for forming a print-receiving layer may be carried out before the pressure-sensitive adhesive composition is applied on the substrate in step (2), or may be carried out after the release film is laminated on the pressure-sensitive adhesive layer in step (4).

EXAMPLES

Hereinafter, the pressure-sensitive adhesive composition and the like of the invention will be described in more detail by way of Examples.

Example 1

1. Preparation of Pressure-Sensitive Adhesive Composition

As disclosed in Table 1, and the following description, a silicone polymer as a component (A), an ultraviolet absorber as a component (B), a platinum group metal catalyst as a component (C), and toluene as a solvent were mixed, and thus a pressure-sensitive adhesive composition having a viscosity at of 2,000 mPa·s was prepared.

Meanwhile, the amounts of incorporation in Table 1 and the following description represent values calculated in terms or the solid content.

| | |
|---|---|
| Component (A): addition reaction type silicone polymer (manufactured by Shin-Etsu Chemical Co., Ltd., X-40-3229) | 100 parts by weight |
| Component (B): 2.2'-dihydroxy-4-methoxybenzophenone (manufactured by Cytec Industries, Inc., CYASORB UV-24, benzophenone-based) | 1 part by weight |
| Component (C): platinum group metal catalyst (manufactured by Shin-Etsu Chemical Co., Ltd., CAT-PL-50T) | 0.017 parts by weight |

Meanwhile, in the following description, 2,2'-dihydroxy-4-methoxybenzophenone as the component (B) may be referred to as "CYASORB UV-24", and the platinum group metal catalyst as the component (C) may be referred to as "CAY-PL-50T".

2. Application of Pressure-Sensitive Adhesive Composition

Subsequently, the pressure-sensitive adhesive composition thus obtained was applied on a substrate made of a polyester film (manufactured by Toyobo Co., Ltd., COSMOSHINE A-4300) having a film thickness of 100 µm so as to obtain a film thickness after drying of 20 µm, using a roll knife coaler, thus forming a coating film.

Next, the coating film was cured by performing a drying treatment under the heating conditions of 120° C. and 2 minutes, and a pressure-sensitive adhesive layer was obtained. Subsequently, a release film made of a polyester film (manufactured by Toray Industries, inc., LUMIRROR T60) having a film thickness of 50 µm was laminated on the surface of the pressure-sensitive adhesive layer, thus forming a pressure-sensitive adhesive sheet having a total film thickness of 170 µm and a substrate/pressure-sensitive adhesive layer/release film structure.

Next, on the substrate surface on the opposite side of the pressure-sensitive adhesive layer in the pressure-sensitive adhesive sheet thus obtained, an acrylate-based ultraviolet-curable resin was applied by a gravure coating method. The acrylate-based ultraviolet-curable resin was subsequently irradiated with ultraviolet radiation for 5 seconds with an amount of radiated energy of 300 mJ/cm$^2$ using a high-pressure UV lamp, thus forming a colorless transparent print-receiving layer having a film thickness of 1 µm. Thereby, a pressure-sensitive adhesive sheet having a print-receiving layer was obtained.

3. Evaluation (1) Evaluation of Curability of Pressure-Sensitive Adhesive

Curability of the pressure-sensitive adhesive in the pressure-sensitive adhesive sheet thus obtained was evaluated.

That is, the release film was peeled off from the pressure-sensitive adhesive sheet thus obtained, and the surface of the exposed pressure-sensitive adhesive layer was attached to a glass.

Subsequently, after one minute passed from the time of attachment, the pressure-sensitive adhesive layer was torn of from the glass, and opacity and resin residue on the glass surface after the tear-off were visually checked. The opacity and resin residue were evaluated according to the following criteria. The results thus obtained are presented in Table 1.

Opacity and resin residue are easily observed on the glass surface in case of insufficient curing of the pressure-sensitive adhesive.

Good (G): Opacity and resin residue on the glass surface are not observed.

Fair (F): Opacity and resin residue on the glass surface are slightly observed.

Bad (B): Opacity and resin residue on the glass surface are observed.

Furthermore, a photograph of the glass surface obtained after the pressure-sensitive adhesive layer in Example 1 had been torn off, which produced the evaluation results "Good", is shown in Region A of FIG. 5(a); and a photograph of the glass surface obtained after the pressure-sensitive adhesive layer in Comparative Example 4 had been torn off, which produced the evaluation results "Bad", is shown in Region B of FIG. 5(b).

(2) Evaluation of the Degree of Recrystallization of Ultraviolet Absorber

The degree of recrystallization of the ultraviolet absorber in the pressure-sensitive adhesive sheet thus obtained was evaluated.

That is, the release film was peeled off from the pressure-sensitive adhesive sheet thus obtained, and the exposed surface of the pressure-sensitive adhesive layer was attached to an adherend made of glass.

Subsequently, the pressure-sensitive adhesive sheet was left attached to the glass for 24 hours in an atmosphere at a temperature of 23° C. and a relative humidity of 50% RH.

Subsequently, the attached surface of the pressure-sensitive adhesive layer of the attached pressure-sensitive adhesive sheaf was visually checked from the glass side, and the degree of recrystallization was evaluated according to the following criteria. The results thus obtained are presented in Table 1.

Good (G): The attached surface is transparent, thus recrystallization of the ultraviolet absorber is not observed.

Fair (F): The attached surface is slightly opaque, thus recrystallization of the ultraviolet absorber is slightly observed.

Bad (B): The attached surface is opaque, thus recrystallization of the ultraviolet absorber is observed.

Furthermore, a photograph of the attached surface in Example 1 which produced the evaluation results "Good", is shown in FIG. 5(a); and a photograph of the attached surface in Comparative Example 4, which produced the evaluation results of "Bad", is shown in FIG. 5(b).

(3) Evaluation of Ultraviolet Transmittance

The ultraviolet transmittance (%) of the pressure-sensitive adhesive sheet thus obtained was evaluated according to ISO 9050.

That is, the transmittance (%) of the pressure-sensitive adhesive sheet thus obtained in the wavelength range of light of 300 nm to 380 nm was measured. The results thus obtained are presented in Table 1.

Meanwhile, it is preferable for practical use that such ultraviolet transmittance has a value of 10% or less.

(4) Evaluation of ΔYI

The ΔYI value (–) for the pressure-sensitive adhesive sheet thus obtained was evaluated.

That is, the initial YI (Yellow Index) value of the pressure-sensitive adhesive sheet thus obtained was measured using a color difference meter (manufactured by Nippon Denshoku Industries Co., Ltd., SE2000).

Subsequently, the pressure-sensitive adhesive sheet thus obtained was accommodated in a sunshine carbon arc lamp type weather resistance tester (manufactured by Suga Test Instruments Co., Ltd., SUNSHINE SUPER LONG-LIFE WEATHER-O-METER WEL-SUN-HCH) (hereinafter, referred to as SWOM") and the pressure-sensitive adhesive sheet was irradiated for 3,000 hours. Thereafter, the permanence YI value was measured.

Next, the ΔYI value was calculated by subtracting the initial YI value from the permanence YI value. The results thus obtained are presented in Table 1.

Meanwhile, the ΔYI value shows that as the value is smaller, the degree of yellowing is lower. For practical use, it is preferable that the ΔYI value is a value of 5% or less.

(5) Evaluation of Lifting of Substrate

Lifting (curling) of the substrate in the pressure-sensitive adhesive sheet thus obtained was evaluated.

That is, a pressure-sensitive adhesive sheet: thus obtained was cut out into a size of 100 mm×100 mm, subsequently the release film was peeled off, and the exposed surface of the pressure-sensitive adhesive layer was attached to a glass. This was used as a specimen.

Subsequently, the specimen thus obtained was: accommodated in the SWOM, and lifting of the substrate from the glass after irradiation for 3,000 hours was measured. The lifting was evaluated according to the following criteria. The results thus obtained are presented in Table 1.

Good (G): Lifting by 2 mm or more is not observed for the respective sides of 100 mm×100 mm.

Bad (B): Lifting by 2 mm or more is observed in some sides of 100 mm×100 mm.

(6) Evaluation of Retention Power

The retention power (mm) of the pressure-sensitive adhesive sheet thus obtained was evaluated according to JIS Z 0237.

That is, the pressure-sensitive adhesive sheet thus obtained was accommodated in the SWOM, and after irradiation for 3,000 hours, the pressure-sensitive adhesive sheet was removed.

Subsequently, the removed pressure-sensitive adhesive sheet was cut out into a size of 25 mm×25 mm, and then the release film was peeled off. The exposed surface of the pressure-sensitive adhesive layer was attached to SUS304 #360, and this was used as a specimen.

Next, a 1-kg weight was mounted on the pressure-sensitive adhesive sheet and was left to stand for 70,000 seconds in an environment at 40° C. The amount of deviation at that time was designated as the retention power (mm), and the retention power was evaluated according to the following criteria. The results thus obtained are presented in Table 1.

Good (G): The retention power has a value of 1 mm or less.

Bad (B): The retention power has a value of above 1 mm.

(7) Evaluation of Adhesiveness of UV-printed characters

The adhesiveness of UV-printed characters to the pressure-sensitive adhesive sheet thus obtained was evaluated according to the old version of JIS K5400.

That is, UV printing was performed on file surface of the print-receiving layer of the pressure-sensitive adhesive sheet thus obtained, at a rate of 28 m²/hour using a UV inkjet printer (manufactured by FUJI FILM Corporation, Luxel Jet UV550GTW), and a decorative sheet was obtained.

The release film of the decorative sheet thus obtained was peeled off, and the exposed surface of the pressure-sensitive adhesive layer was attached to glass. This was used as a specimen.

Subsequently, the specimen thus obtained was accommodated in the SWOM, and after irradiation for 3,000 hours, the specimen was removed.

Subsequently, on the UV-printed surface of the specimen, eleven incisions reaching the substrate were inserted using a cutter knife at an interval of 1 mm respectively in the longitudinal direction and the horizontal direction, and thus one hundred crosscuts were formed. This was used as a specimen.

Subsequently, CELLOTAPE (registered trademark) (manufactured by Nichiban Co., Ltd.) was strongly contact-bonded to the crosscut parts thus formed, and then a corner of the CELLOTAPE (registered trademark) was torn off at an angle of 45°. The state of the crosscuts was checked by visual inspection, and the state was evaluated according to the following criteria. The results thus obtained are presented in Table 1.

Good (G): The number of detached squares is below 35.

Bad (B): The number of detached squares is 35 or larger.

Example 2

In Example 2, a pressure-sensitive adhesive sheet was produced in the same manner as in Example 1, except that when the pressure-sensitive adhesive composition was prepared, the amount of incorporation of the ultraviolet absorber as the component (B) was changed to 2.52 parts by weight, and the pressure-sensitive adhesive sheet was evaluated. The results thus obtained are presented in Table 1.

Example 3

In Example 3, a pressure-sensitive adhesive sheet was produced in the same manner as in Example 1, except that when the pressure-sensitive adhesive composition was prepared, the amount of incorporation of the ultraviolet absorber as the component (B) was changed to 3.97 parts by weight, and the pressure-sensitive adhesive sheet was evaluated. The results thus obtained are presented in Table 1.

Example 4

In Example 4, a pressure-sensitive adhesive sheet was produced in the same manner as in Example 1, except that when the pressure-sensitive adhesive composition was prepared, the amount of incorporation of the ultra violet absorber as the component (B) was changed to 3.97 parts by weight, and the film thickness of the pressure-sensitive adhesive layer was changed to 40 μm, and the pressure-sensitive adhesive sheet was evaluated. The results thus obtained are presented in Table 1.

Comparative Example 1

In Comparative Example 1, a pressure-sensitive adhesive sheet was produced in the same manner as in Example 1, except that when the pressure-sensitive adhesive composition was prepared, an ultraviolet absorber as the component (B) was not incorporated into the composition, and the pressure-sensitive adhesive sheet was evaluated. The results thus obtained are presented in Table 1.

Comparative Example 2

In Comparative Example 2, a pressure-sensitive adhesive sheet was produced in the same manner as in Example 1 except that when the pressure-sensitive adhesive composition was prepared, the amount of incorporation of the ultraviolet absorber as component (B) was changed to 0.5 parts by weight, and the pressure-sensitive adhesive sheet was evaluated. The results thus obtained are presented in Table 1.

Comparative Example 3

In Comparative Example a pressure-sensitive adhesive sheet was produced in the same manner as in Example 1, except that when the pressure-sensitive adhesive composition was prepared, the amount of incorporation of the ultraviolet absorber as the component (B) was changed to 0.8 parts by weight, and the pressure-sensitive adhesive sheet was evaluated. The results thus obtained are presented in Table 1.

Comparative Example 4

In Comparative Example 4, a pressure-sensitive adhesive sheet was produced in the same manner as in Example 1, except that when the pressure-sensitive adhesive composition was prepared, the kind of the ultraviolet absorber as the component (B) was changed to benzophenone (manufactured by Kanto Chemical Co., Inc., benzophenone), and the amount of incorporation of the ultraviolet absorber was changed to 5.06 parts by weight, and the pressure-sensitive adhesive sheet was evaluated. The results thus obtained are presented in Table 1.

Comparative Example 5

In Comparative Example 5, a pressure-sensitive adhesive sheet was produced in the same manner as in Example 1, except that when the pressure-sensitive adhesive composition was prepared, the kind of the ultraviolet absorber as the component (B) was changed to benzophenone (manufactured by Kanto Chemical Co., Inc., benzophenone), the amount of incorporation of the ultraviolet absorber was changed to 5.06 parts by weight, and the film thickness of the pressure-sensitive adhesive layer was changed to 40 μm, and the pressure-sensitive adhesive sheet was evaluated. The results thus obtained are presented in Table 1.

Comparative Example 6

In Comparative Example 6, a pressure-sensitive adhesive sheet was produced in the same manner as in Example 1, except that when the pressure-sensitive adhesive composition was prepared, the amount of incorporation of the ultraviolet absorber as the component (B) was changed to 10 parts by weight, and the pressure-sensitive adhesive sheet was evaluated. The results thus obtained are presented in Table 1.

Comparative Example 7

In Comparative Example 7, a pressure-sensitive adhesive sheet was produced in the same manner as in Example 1, except that when the pressure-sensitive adhesive composition was prepared, the kind of the ultraviolet absorber as the component (B) was changed to a hindered amine-based ultraviolet absorber (manufactured by BASF SE, TINUVIN 123), and the amount of incorporation of the ultraviolet absorber was changed to 2.52 parts by weight, and the pressure-sensitive adhesive sheet was evaluated. The results thus obtained are presented in Table 1.

Meanwhile, in the following description, the hindered amine-based ultraviolet absorber as the component (B) may be referred to as "TINUVIN 123".

Comparative Example 8

In Comparative Example 8, a pressure-sensitive adhesive sheet was produced in the same manner as in Example 1, except that when the pressure-sensitive adhesive composition was prepared, the kind of the ultraviolet absorber as the component (B) was changed to a benzotriazole-based ultraviolet absorber (manufactured by Everlight Chemical Industrial Co., EVERSORP 109), and the amount of incorporation of the ultraviolet absorber was changed to 2.52 parts by weight, and the pressure-sensitive adhesive sheet was evaluated. The results thus obtained are presented in Table 1.

Meanwhile, in the following description, the benzotriazole-based ultraviolet absorber as the component (B) may be referred to as "EVERSORP 109".

Comparative Example 9

In Comparative Example 9, a pressure-sensitive adhesive sheet was produced n the same manner as in Example 1, except that when the pressure-sensitive adhesive composition was prepared, the kind of the ultraviolet absorber as the component (B) was changed to a benzotriazole-based ultraviolet absorber (manufactured by BASF SE, TINUVIN 900) and the amount of incorporation of the ultraviolet absorber was changed to 2.52 parts by weight, and the pressure-sensitive adhesive sheet was evaluated. The results thus obtained are presented in Table 1.

Meanwhile, in the following description, the benzotriazole-based ultraviolet absorber as the component (B) may be referred to as "TINUVIN 900".

Comparative Example 10

In Comparative Example 10, a pressure-sensitive adhesive sheet was produced in the same manner as in Example 1, except that when the pressure-sensitive adhesive composition was prepared, the kind of the ultraviolet absorber as the component (B) was changed to a hydroxyphenyltriazine-based ultraviolet absorber (manufactured by BASF SE, TINUVIN 460), and the amount of incorporation of the ultraviolet absorber was changed to 2.52 parts by weight, and the pressure-sensitive adhesive sheet was evaluated. The results thus obtained are presented in Table 1.

Meanwhile, in the following description, the hydroxyphenyltriazine-based ultraviolet absorber as the component (B) may be referred to as "TINUVIN 460".

Table 1

| | Pressure-sensitive adhesive | | | | | | |
|---|---|---|---|---|---|---|---|
| | Component (A) Silicone polymer | | Component (B) Ultraviolet absorber | | Component (C) Platinum catalyst | | |
| | Kind | Amount of incorporation (parts by weight) | Kind | Amount of incorporation (parts by weight) | Kind | Amount of incorporation (parts by weight) | Film thickness (μm) |
| Example 1 | Addition reaction type silicone polymer | 100 | CYASORB UV-24 (benzophenone-based) | 1.00 | CAT-PL-50T | 0.017 | 20 |
| Example 2 | | | | 2.52 | | | 20 |
| Example 3 | | | | 3.97 | | | 20 |
| Example 4 | | | | 3.97 | | | 40 |
| Comparative Example 1 | | | | 0.00 | | | 20 |
| Comparative Example 2 | | | | 0.50 | | | 20 |
| Comparative Example 3 | | | | 0.80 | | | 20 |
| Comparative Example 4 | | | Benzophenone (benzophenone-based) | 5.06 | | | 20 |
| Comparative Example 5 | | | | 5.06 | | | 40 |
| Comparative Example 6 | | | CYASORB UV-24 (benzophenone-based) | 10.00 | | | 20 |
| Comparative Example 7 | | | TINUVIN123 (hindered amine-based) | 2.52 | | | 20 |
| Comparative Example 8 | | | EVERSORP109 (benzotriazole-based) | 2.52 | | | 20 |
| Comparative Example 9 | | | TINUVIN900 (benzotriazole-based) | 2.52 | | | 20 |
| Comparative Example 10 | | | TINUVIN460 (hydroxyphenyltriazine-based) | 2.52 | | | 20 |

Table 1 Continued

|  | Evaluation | | | | | | |
|---|---|---|---|---|---|---|---|
|  | Curability of pressure-sensitive adhesive | Degree of recrystallization of ultraviolet absorber | Ultraviolet transmittance (%) | ΔYI value (-) | Lifting of substrate | Retention power | Adhesiveness of UV-printed characters |
| Example 1 | G | G | 9.3 | 4.5 | G | G | G |
| Example 2 | G | G | 8.2 | 2.2 | G | G | G |
| Example 3 | G | G | 6.3 | 1.4 | G | G | G |
| Example 4 | G | G | 2.9 | 0.8 | G | G | G |
| Comparative Example 1 | G | *1- | 83 | 8.5 | B | G | B |
| Comparative Example 2 | G | G | 17.4 | 7.6 | B | G | B |
| Comparative Example 3 | G | G | 13.8 | 5.8 | B | G | B |
| Comparative Example 4 | B | B | *2- | *2- | *2- | *2- | *2- |
| Comparative Example 5 | B | B | *2- | *2- | *2- | *2- | *2- |
| Comparative Example 6 | B | B | *2- | *2- | *2- | *2- | *2- |
| Comparative Example 7 | B | G | *2- | *2- | *2- | *2- | *2- |
| Comparative Example 8 | B | G | *2- | *2- | *2- | *2- | *2- |
| Comparative Example 9 | B | G | *2- | *2- | *2- | *2- | *2- |
| Comparative Example 10 | B | G | *2- | *2- | *2- | *2- | *2- |

INDUSTRIAL APPLICABILITY

As described above, according to the invention, a good balance can be achieved between contradictory characteristics, namely, weather resistance and curability of the silicone polymer in a well-balanced manner, by incorporating a predetermined ultra violet absorber in an amount within a predetermined range with respect to the silicone polymer as a main agent.

Therefore, the pressure-sensitive adhesive composition of the invention and a pressure-sensitive adhesive sheet using this composition are expected to significantly contribute to product quality enhancement of decorative sheets that are attached to, for example, window panes inside apparel-related shops.

EXPLANATIONS OF LETTERS OR NUMERALS

10: Substrate,
20: Pressure-sensitive adhesive layer,
30: Release film,
40: Print-receiving layer,
100: Pressure-sensitive adhesive sheet,
100a: Pressure-sensitive adhesive sheet of type having print-receiving layer,
100': Pressure-sensitive adhesive sheet in a state of having release film peeled off,
200: Window pane,
300: Sun,
350: Ultraviolet radiation

The invention claimed is:

1. A pressure-sensitive adhesive composition comprising an addition reaction silicone polymer as a component (A); an ultraviolet absorber as a component (B); and a platinum group metal catalyst as a component (C),
wherein the ultraviolet absorber as the component (B) includes a benzophenone-based ultraviolet absorber,
the amount of incorporation of the ultraviolet absorber as the component (B) is set to a value within the range of 1 to 4 parts by weight relative to 100 parts by weight of the addition reaction silicone polymer as the component (A), and
the amount of incorporation of the platinum group metal catalyst as the component (C) is set to a value within the range of 0.017 to 0.05 parts by weight relative to 100 parts by weight of the addition reaction silicone polymer as the component (A);
wherein the benzophenone-based ultraviolet absorber is at least one selected from the group consisting of 2,2'-dihydroxy-4-methoxybenzophenone, 2,4-dihydroxybenzophenone, 2-hydroxy-4-methoxybenzophenone, 2-hydroxy-4-octoxybenzophenone, 2-hydroxy-4-methoxybenzophenone-5-sulfonic acid hydrate, 2-hydroxy-4-octyloxybenzophenone, 4-dodecyloxy-2-hydroxybenzophenone, 2,2',4,4'-tetrahydroxybenzophenone and 2,2'-dihydroxy-4,4'-dimethoxybenzophenone.

2. A pressure-sensitive adhesive sheet comprising a substrate, a pressure-sensitive adhesive layer, and a release film, the pressure-sensitive adhesive layer being formed from a pressure-sensitive adhesive composition including an addition reaction silicone polymer as a component (A), an ultraviolet absorber as a component (B), and a platinum group metal catalyst as a component (C), wherein the ultraviolet absorber as the component (B) includes a benzophenone-based ultraviolet absorber, the amount of incorporation of the ultraviolet absorber as the component (B) is set to a value within the range of 1 to 4 parts by weight relative to 100 parts by weight of the addition reaction silicone polymer as the component (A), and the amount of incorporation of the platinum group metal catalyst as the component (C) is set to a value within the range of 0.017 to 0.05 parts by weight relative to 100 parts by weight of the addition reaction silicone polymer as the component (A).

3. The pressure-sensitive adhesive sheet according to claim 2, wherein the pressure-sensitive adhesive sheet has a print-receiving layer on the surface of the substrate on the opposite side of the pressure-sensitive adhesive layer.

4. The pressure-sensitive adhesive sheet according to claim 3, wherein the print-receiving layer is a cured product of a photocurable coating material.

5. The pressure-sensitive adhesive sheet according to claim 2, wherein the film thickness of the pressure-sensitive adhesive layer is set to a value within the range of 5 μm to 50 μm.

* * * * *